US006006422A

United States Patent [19]

Hickox

[11] Patent Number: 6,006,422

[45] Date of Patent: Dec. 28, 1999

[54] CONNECTOR MECHANICAL ASSIST SYSTEM

[75] Inventor: Jeffrey M. Hickox, Middlefield, Ohio

[73] Assignee: General Motors Corporation, Detroit, Mich.

[21] Appl. No.: 09/207,750

[22] Filed: Dec. 8, 1998

[51] Int. Cl.[6] .......... B23P 19/00

[52] U.S. Cl. .......... 29/758; 29/758; 29/764; 81/302; 294/95

[58] Field of Search .......... 29/753, 750, 758, 29/759, 760, 729, 764; 81/302; 294/95, 97, 115

[56] References Cited

U.S. PATENT DOCUMENTS

| | | | |
|---|---|---|---|
| 1,992,596 | 2/1935 | Bangle | 29/758 |
| 2,364,953 | 12/1944 | Daley | 81/302 |
| 3,570,096 | 3/1971 | Sosinski | 29/203 |
| 3,588,983 | 6/1971 | Hoy | 29/203 |
| 3,604,092 | 9/1971 | Knickerbocker | 29/203 H |
| 3,844,013 | 10/1974 | Hall, Jr. | 29/203 H |
| 3,995,363 | 12/1976 | Medina, Jr | 29/280 |
| 4,068,374 | 1/1978 | Coller | 29/747 |
| 4,141,138 | 2/1979 | Quick | 29/740 |
| 4,340,249 | 7/1982 | Bucklew | 294/95 |
| 4,385,438 | 5/1983 | Bertellotti et al. | 29/764 |
| 4,577,899 | 3/1986 | Hemingway | 294/95 |
| 4,583,287 | 4/1986 | McDevitt et al. | 29/741 |
| 5,327,641 | 7/1994 | Olsson | 29/747 |

FOREIGN PATENT DOCUMENTS

| | | | |
|---|---|---|---|
| 447248 | 4/1949 | Italy | 81/302 |

*Primary Examiner*—Lee Young
*Assistant Examiner*—Minh Trinh
*Attorney, Agent, or Firm*—Patrick M. Griffin

[57] ABSTRACT

A connector mechanical assist system incorporating a mating tool and a connector configured for being squeezably interfaced with the mating tool. The connector is composed of first and second components having a conventional interlock mechanism, wherein a passage is provided in each of the first and second components which align when the first and second components are initially mated to form a passageway through the connector. The mating tool is composed of a head and two blades pivotally mounted on a common pivot in a cammed and slidable relation to the head. The blades have opposingly oriented hooks at the distal end portions thereof, wherein the hooks are retracted when the blades are mutually parallel. Each blade has a cam surface which interfaces with a respective boss of the head. With the connector pre-staged and the blades parallel, the blades are inserted through the passageway of the connector so that the distal end portions project therefrom at an exit side of the connector. Next, the blades are rearwardly drawn in relation to the head, whereupon the blades mutually cross and the hooks become opposingly exposed so as to contact the connector. Further rearward movement of the blades results in a mating force being applied which forces the first and second components into full mating.

13 Claims, 4 Drawing Sheets

CONNECTOR MECHANICAL ASSIST SYSTEM

BACKGROUND OF THE INVENTION

1. Field of the Invention

The present invention relates to connectors having mating first and second components. More particularly, the present invention relates to a tool and connector which cooperate to provide a mechanical assist to mating the first and second components of the connector.

2. Description of the Prior Art

Connectors are widely used, particularly in association with the electrical arts. For example, in the automotive industry a multiplicity of connectors are used in the assembly of an automobile. Connectors generally are characterized by an interlocking arrangement between a first component and a second component. The interlock is achieved usually by a snap fit of interfering parts, wherein a mating force must be applied to cause one or more components of the interlock mechanism to deform and thereupon engage. Ordinarily, but not necessarily, the first component is male configured and the second component is female configured.

A mating force in the range of up to 135 Newtons can be achieved by hand effort. However, ergonomic concerns now regard an acceptable upper limit on hand effort to be about 80 Newtons where an assembly environment involves high volume production. Indeed, there is consideration for setting a new upper limit of 67 Newtons. Yet, problematically, many connectors require a mating force of between 80 and 135 Newtons to achieve full engagement of the interlock mechanism thereof. Accordingly, some form of assist is needed in high volume assembly situations.

In the prior art, it is known to use bolts, drawer slides, cams, and the like to provide a mechanical advantage sufficient that hand effort to mate the first and second components is no more than the 80 Newtons, even where the required mating force is in excess of 80 Newtons. However, these known mechanical assist devices suffer from one or more of the following disadvantages: cost, excess connector weight, difficult disassembly, and loose parts.

Accordingly, what remains needed in the art is a mechanical assist for mating first and second components of a connector in a simple and easy manner without any of the aforementioned disadvantages.

SUMMARY OF THE INVENTION

The present invention is a connector mechanical assist system incorporating a mating tool and a connector configured for squeezably interfaced with the mating tool.

The connector is composed of first and second components having a conventional interlock mechanism, wherein a passage is provided in each of the first and second components which align when the first and second components are initially mated to form a passageway through the connector. In this regard, it is preferred to have a two-stage interlock mechanism, wherein the first stage of mating requires little mating force to achieve.

The mating tool is composed of a head and two blades pivotally mounted on a common pivot in a cammed and slidable relation to the head. The blades have opposingly oriented hooks at the distal end portions thereof, wherein the hooks are retracted when the blades are mutually parallel. Each blade has a cam surface which interfaces with a respective boss of the head. In operation of the mating tool, the blades are mutually parallel when fully forward of the head. As the blades are pulled rearwardly into the head, the bosses interact with the cam surfaces to cause the blades to become mutually crossed by pivoting on the common pivot, thereby causing the hooks to become opposingly exposed. Now, any further rearward movement of the blades results in the blades maintaining the mutually crossed relationship and the blade exposure. Movement of the blades forwardly in relation to the head reverses the pivoting near the end of travel.

In operation of the connector mechanical assist system according to the present invention, the connector is prestaged wherein the first and second components are at an initial stage of mating with little mating force being involved, preferably at a first stage of a two-stage interlock mechanism. Now, with the blades in the forward-most, mutually parallel position, the blades are inserted through the passageway of the connector so that the distal end portions project therefrom at an exit side of the connector (which is opposite the entry side thereof). Next, the blades are rearwardly drawn in relation to the head, whereupon the blades mutually cross and the hooks become opposingly exposed. The hooks contact the connector adjacent the passageway and then apply a mating force when the hooks-to-head distance is equal to the connector width. Further rearward movement of the blades results in a mating force being applied which forces the first and second components into full mating. Now, the blades are forwardly moved relative to the head until the hooks are again retracted, and the blades are thereupon slid out from the passageway.

To achieve a desired mechanical advantage, for example requiring a hand effort of less than 67 Newtons, the mating tool may be hand operated via a pliers-like configuration, or alternatively, the mating tool may be actuator operated via electricity or fluidic (pneumatic or hydraulic) pressure.

Accordingly, it is an object of the present invention to provide a mechanical assist for providing a mating force to mate first and second components of a connector.

It is an additional object of the present invention to provide a mechanical assist for providing a mating force to mate first and second components of a connector, wherein the connector is configured to interface with cam controlled blades of a mating tool such that when the blades are selectively moved relative to the connector, a mating force is generated with respect to the connector.

These, and additional objects, advantages, features and benefits of the present invention will become apparent from the following specification.

DETAILED DESCRIPTION OF THE PREFERRED EMBODIMENT

Figure 1:
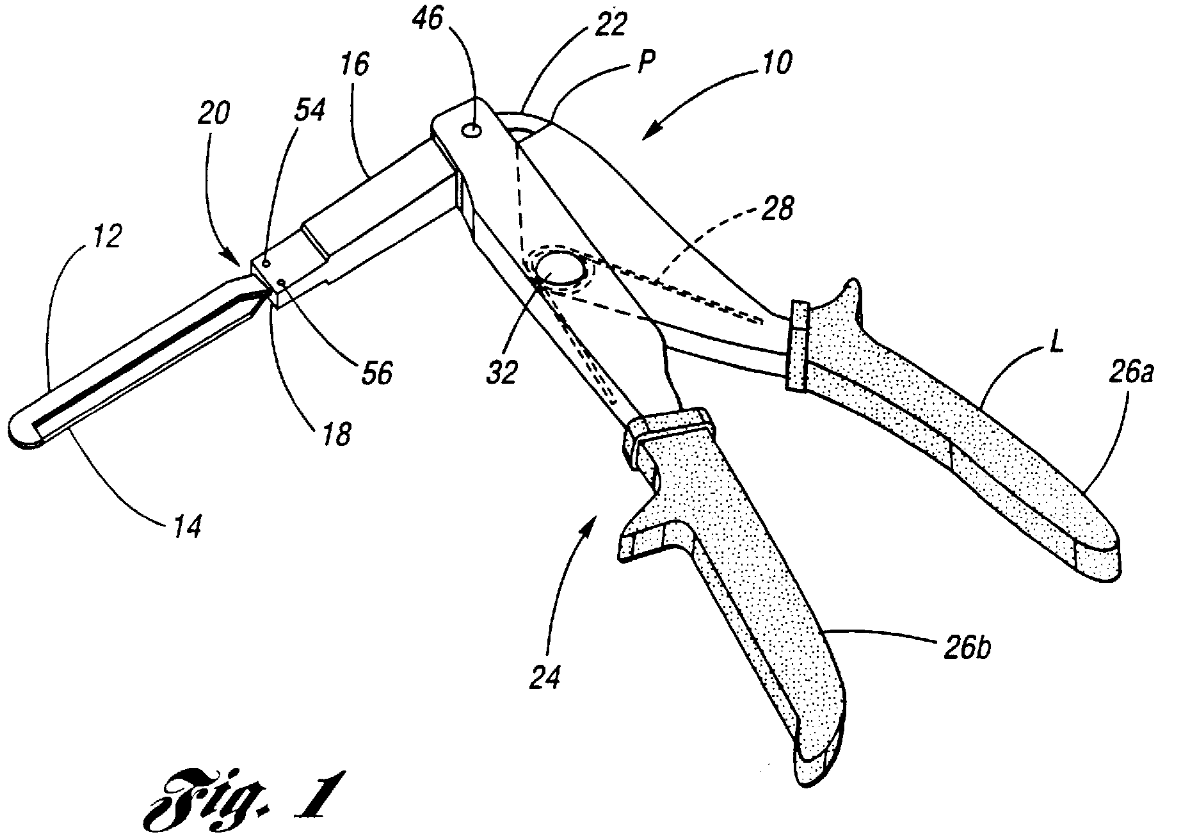
FIG. 1 is a perspective view of a hand operated mating tool according to the present invention, shown in its initial state of operation.
Figure 2:
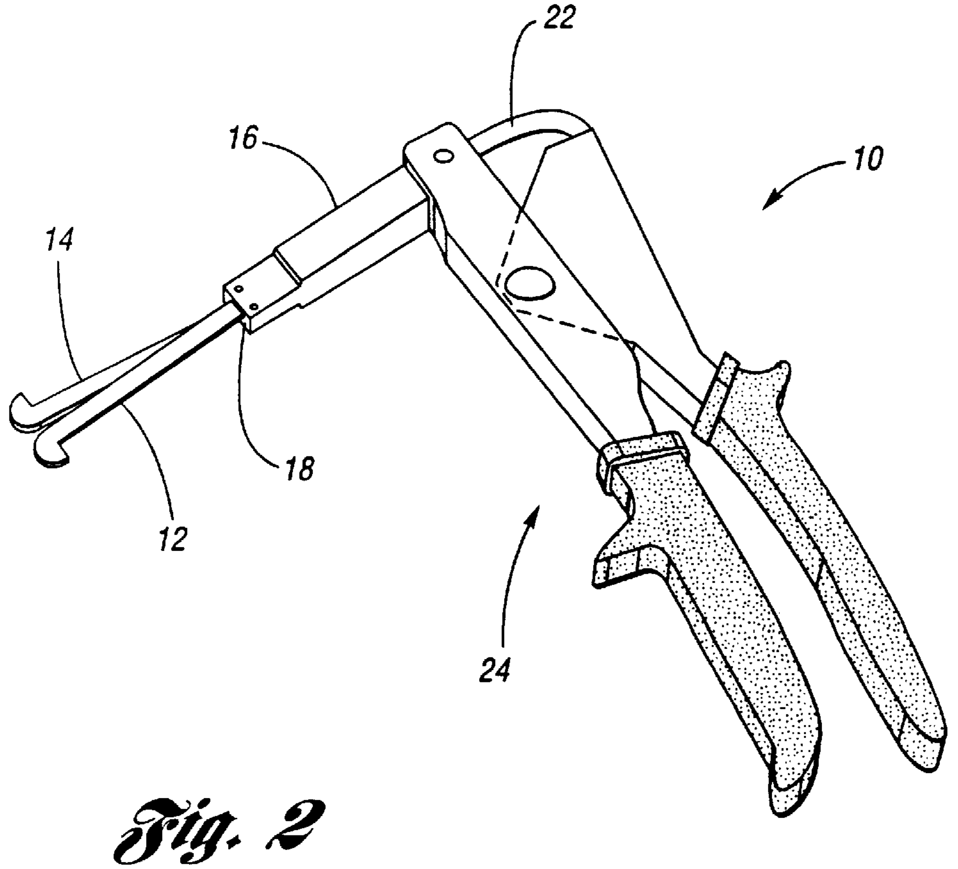
FIG. 2 is a perspective view of the hand operated mating tool of FIG. 1, shown in its final state of operation.
Figure 3:
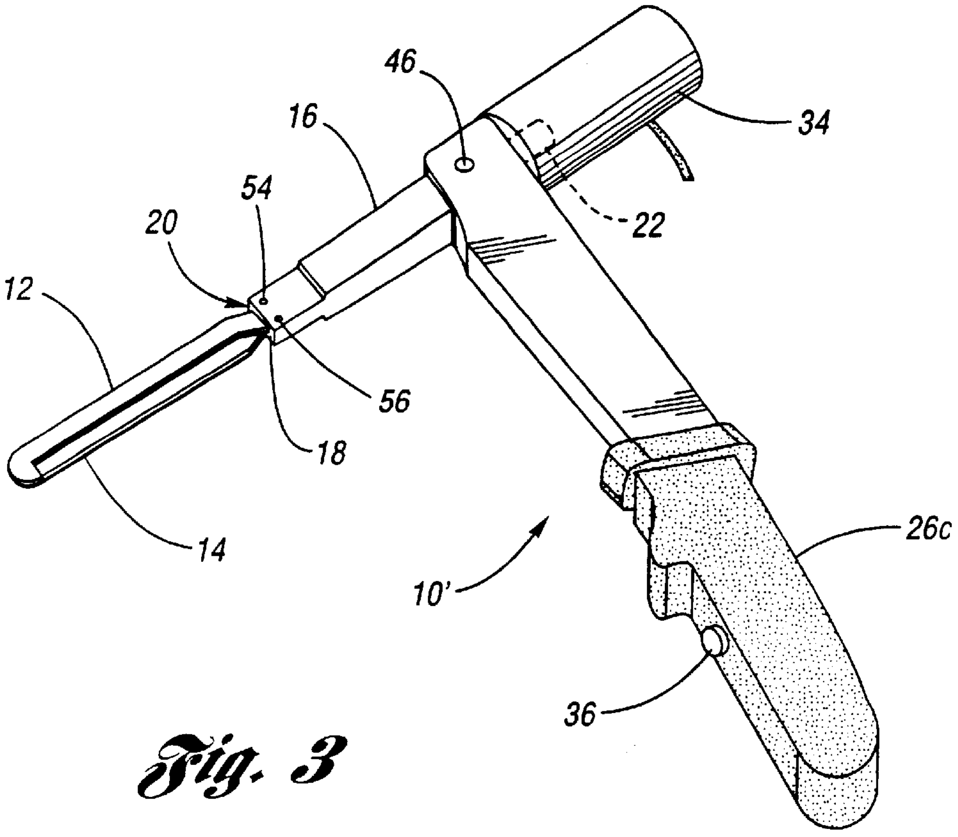
FIG. 3 is a perspective view of an actuator operated mating tool according to the present invention, shown in its initial state of operation.
Figure 4:
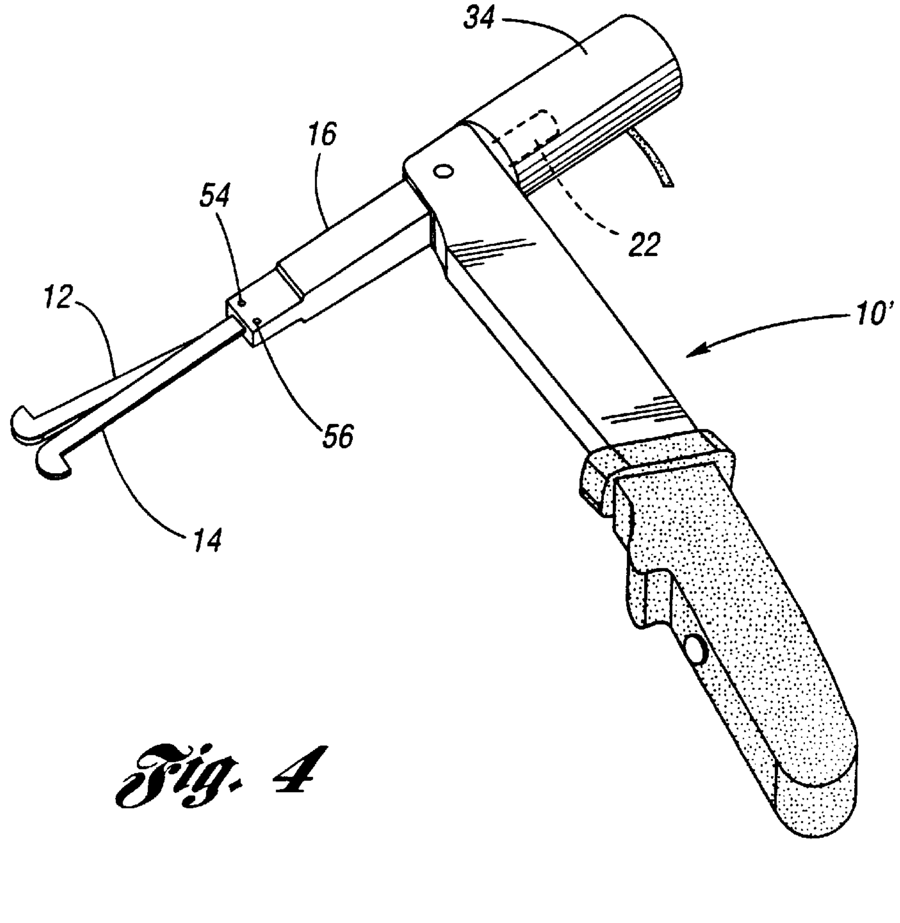
FIG. 4 is a perspective view of an actuator operated mating tool of FIG. 3, shown in its final state of operation.

Referring now to the Drawings, FIGS. 1 and 2 depict a hand operated mating tool 10 and FIGS. 3 and 4 depict an actuator operated mating tool 10'. In either type of mating tool 10, 10', a pair of blades 12, 14 project from, and are slidably interfaced with, a head 16. The blades 12, 14 are slidable in relation to a forward end 18 of the head 16 between an initial position, shown at FIGS. 1 and 3, to a final position, shown at FIGS. 2 and 4. A cam mechanism 20 (see FIGS. 5 through 7) associated with the head 16 and with the blades 12, 14 causes the blades to pivot from a mutually parallel relationship at the initial position to a mutually crossed relationship as the blades are retractively slid relative to the head.

Figure 5:
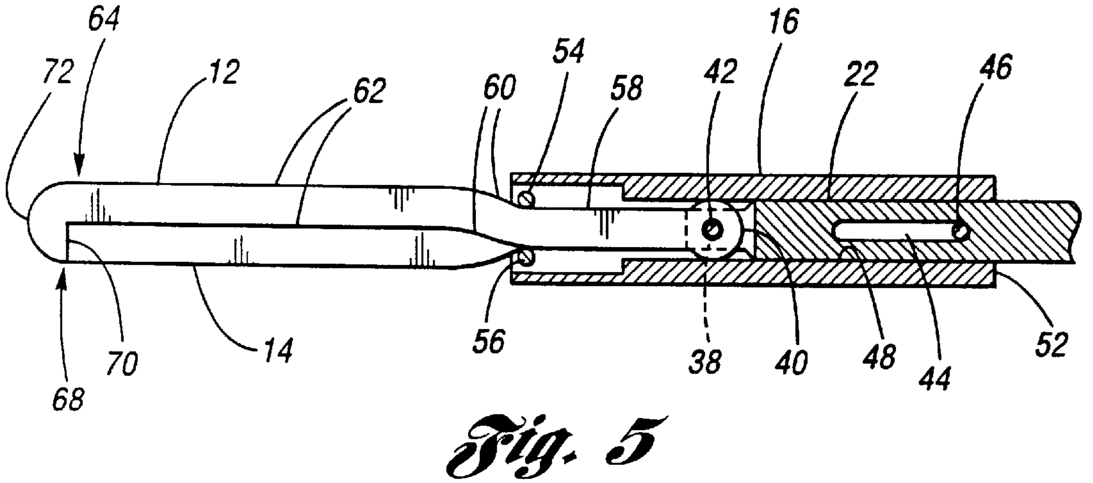
FIGS. 5 through 7 are partly sectional views of progressive steps of cammed movement of the blades of the mating tool.
Figure 6:
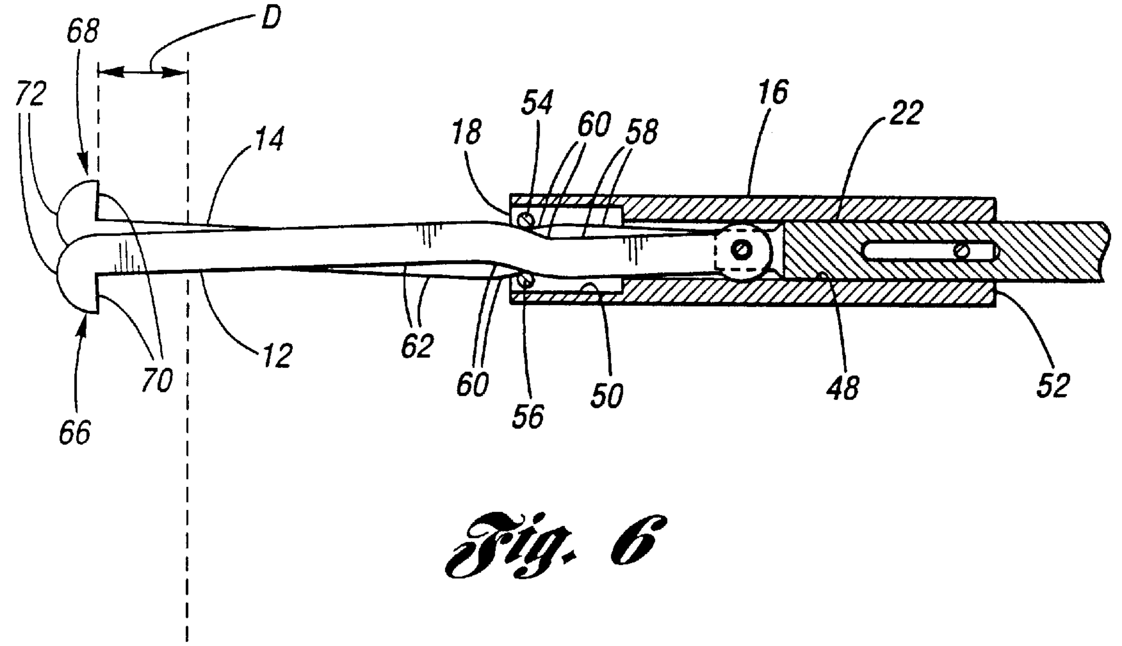
Figure 7:
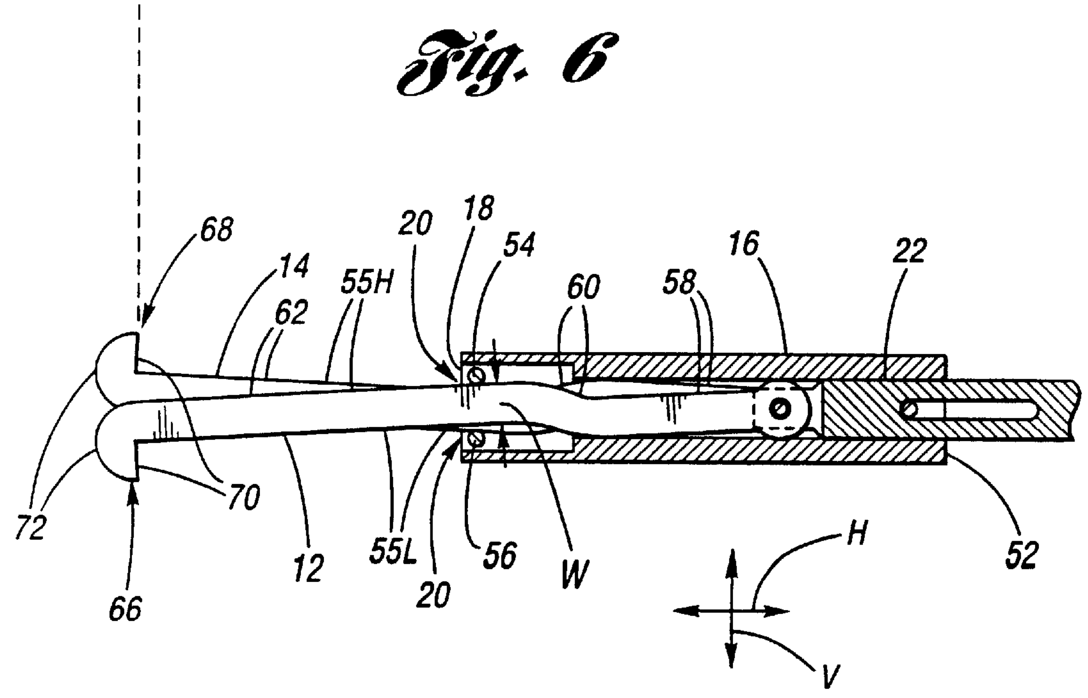

As can be seen by reference to FIGS. 5 through 7, the mechanical linkage to drive reciprocal sliding of the blades 12, 14 preferably includes a drive rod 22 pivotally connected with the blades and slidably interfaced with the head 12, 14. The drive rod 22 may be slidably driven by either a hand operated drive agency or by an actuator operated drive agency.

As shown at FIGS. 1 and 2, a hand operated drive agency in the form of a lever action is supplied by a pliers 24. The first and second handle members **26*a*, 26*b* are mutually squeezed together against a preselected spring force of a spring 28, whereupon the drive rod 22 is slid. The ratio of the lever arms (ie., the hand squeeze locus L of the handle member 26*a* to the fulcrum 32 vs. the remainder of the handle from approximately the location P to the fulcrum 32) defines the hand force deliverable to the drive rod 22, which is predetermined. For example, a hand force of 67 Newtons at the locus L of the handle 26*a*, 26*b* generating a slide force of 135 Newtons at drive rod 22**.

As shown at FIGS. 3 and 4, an actuator operated drive agency in the form of an electric, or fluidic (pneumatic or hydraulic) actuator 34 is pivotally connected with the drive rod 22. The issue of hand force is obviated, in that all the operator need do is press an actuation button 36 on the handle **26*c***.

Referring now to FIGS. 5 through 7, the pivotal interconnection of the drive rod 22 to the blades 12, 14 is for example accomplished by a clevis 38 at the end of the drive rod which receives a disk shaped end 40 of the blades. The clevis 38 and the disk shaped ends 40 have aligned holes through which a pivot pin 42 is placed. Preferably the limits of travel of the drive rod 22 relative to the head 16 is defined by a rod slot 44 of the drive rod 22 and a therein received limit pin 46 of the head 16.

The head 16 is provided, preferably, with first and second cavities 48, 50. The first cavity 48 is of cylindrical cross-section for guidably receiving the drive rod 22 and opens to the rearward end 52 of the head 16. The second cavity 50 is vertically elongated for accommodating the aforementioned crossing of the blades 12, 14 and opens to the forward end 18 of the head 16. The first and second cavities 48, 50 communicate with each other within the head 16.

Adjacent the forward end 18 of the head 16 are located a pair of bosses 54, 56. The bosses 54, 56 may be in the form of roller bearings, or any other analogous form, such as for example in the form of stationary dowels. The bosses 54, 56 are spaced apart in the vertical axis V a distance equal to about the width W of the blades 12, 14. The blades 12, 14 each have an upper camming surface 55U and a lower camming surface 55L. The combination of the upper and lower camming surfaces 55U, 55L of the blades 12, 14 with respective bosses 54, 56 form the aforementioned camming mechanism 20, whereby the blades are guided in the vertical axis V.

The blades 12, 14 are each identical and arranged side-by-side, wherein one of the blades is reversed (that is, flipped over or upside down) relative to the other. As seen by reference to the fully visible blade 14, the blades have a first axial portion 58 which terminates at the disk shaped end 40. The first axial portion 58, opposite the disk shaped end 40, is adjoined by an off-set 60, the lateral displacement of which being by an amount equal to about the blade width W. Adjoining the off-set 60 is a second axial portion 62 which is parallel to the first axial portion 58, but, because of the off-set 60, is displaced laterally therefrom by the blade width W along the vertical axis V.

The distal end portions 64 of the blades 12, 14 are characterized by opposingly oriented hooks 66, 68, wherein an abutment 70 is provided equal to approximately the blade width W. Preferably, the end 72 of each of the blades 12, 14 is rounded.

Operation of the mating tool 10, 10' will now be detailed.

As shown at FIGS. 1, 3 and 5, the blades 12, 14 are at the initial state of operation of the mating tool 10, 10', whereat they are mutually parallel and the hooks 66, 68 thereof are unexposed. As now shown at FIG. 6, when the drive rod 22 is slid along the horizontal axis H (see FIG. 7), the off-set 60 passes between the bosses 54, 56. The upper and lower camming surfaces 55U, 55L at the off-set 60 of each blade 12, 14 cause the blades to pivot on the pivot pin 42, whereupon the blades mutually cross each other, and the hooks 66, 68 become exposed. The location of substantial exposure of the hooks 66, 68 (and, as a consequence, the respective abutments 70 thereof) is designated as the intermediate stage of operation of the mating tool and is generally shown at FIG. 6. As shown at FIGS. 2, 4 and 7, when the drive rod 22 has reached its furthest movement horizontally and the blades are at the final stage of operation, the hooks remain fully exposed. Reverse movement of the blades relative to the head (via forward sliding movement of the drive rod) reverses the aforesaid blade pivoting.

It will be appreciated that there is a differential distance D between the abutments 70 and the forward end 18 as the blades move from the intermediate stage of operation to the final stage of operation. This differential distance D is a feature of the mating tool 10, 10' which serves to squeeze the first and second components of a connector into a fully mated engagement.

Figure 8:
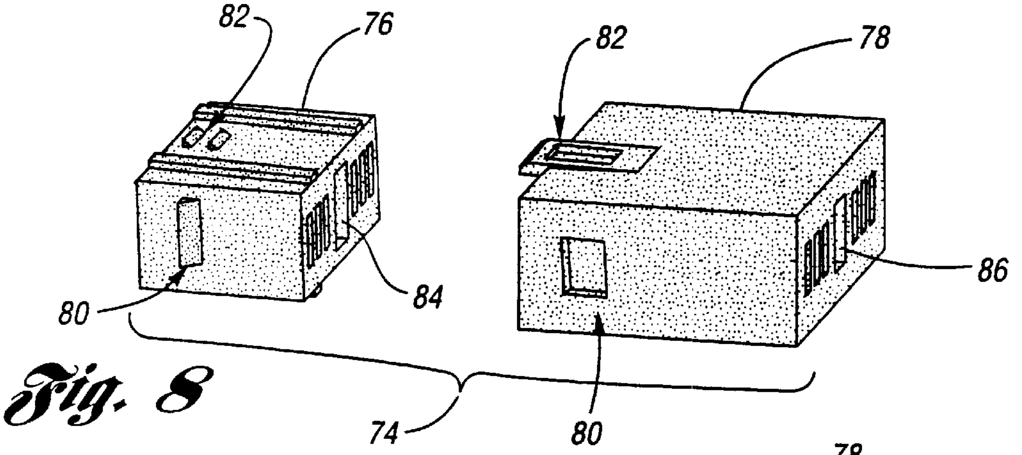
FIG. 8 is an exploded perspective view of a connector according to the present invention.

As shown at FIG. 8, a connector 74 has a first component 76 and a second component 78. The first and second components are structured to mate in a predetermined, conventional manner (such as for example a male configured component mating into a female configured component), inclusive of an interlock mechanism 80. Preferably the interlock mechanism 80 includes a two-stage lock 82 for providing a pre-stage, wherein the first and second components are initially mated (brought together) with application of just a little mating force being involved. The first component 76 has a first passage 84 therethrough, and the second component 78 has a second passage 86 therethrough. The first and second passages are located so that they align when the first and second components are pre-staged, whereupon a passageway 88 is formed straight through the connector 74.

Figure 9:
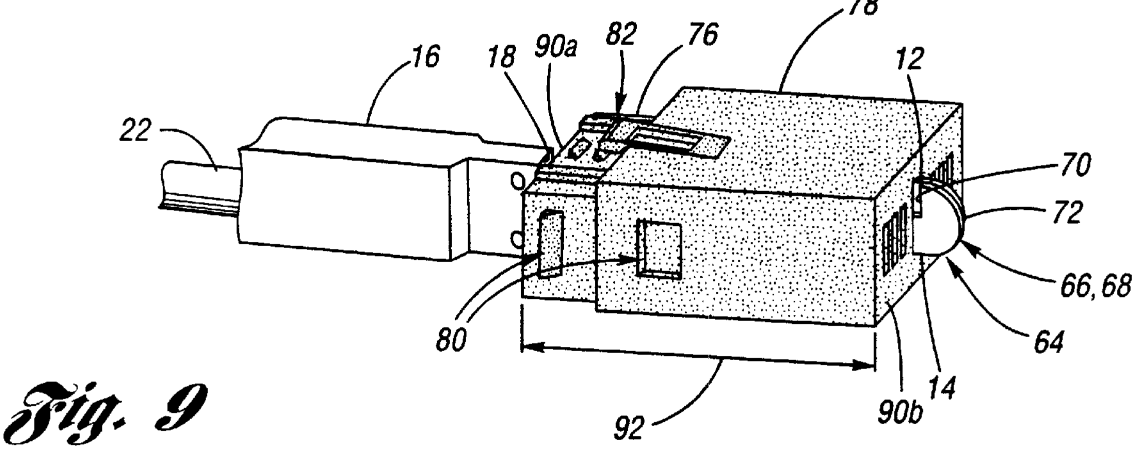
FIG. 9 is a perspective view showing the blades of the mating tool inserted through the passageway of the connector, wherein the connector is shown pre-staged.

The mating tool 10, 10' is brought up to the connector 74 after pre-staging thereof. With the mating tool at the initial state of operation, the rounded end faces 72 are directed toward an entry side 90*a* of the connector 74, and the blades 12, 14 are thrust into passageway 88, wherein the passageway is dimensioned to receive the blades when they are in the mutually aligned state (see FIG. 9). Thrusting concludes when the forward end 18 of the head is adjacent the entry side 90*a* of the connector and the second axial portion 62 extends entirely through the passageway such that the distal end portions 64 project from the exit side 90*b* of the connector.

Figure 10:
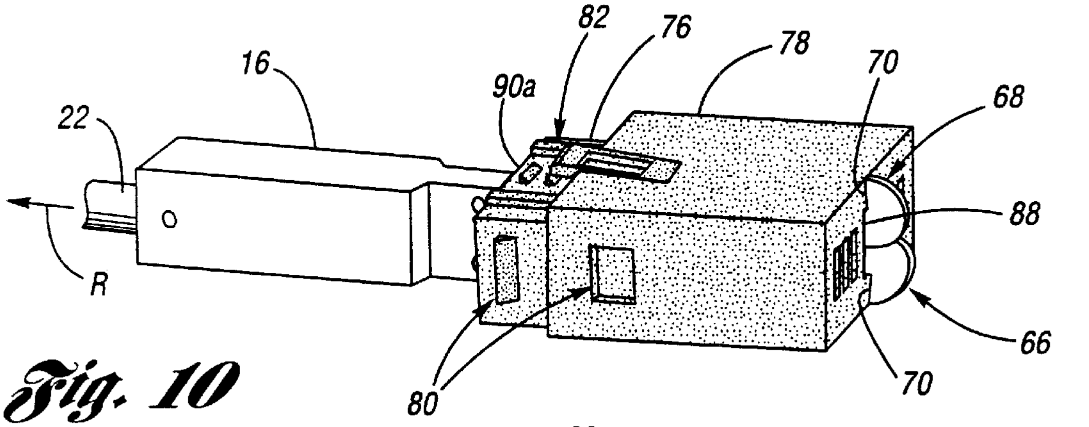
FIG. 10 is a perspective view, now showing the hooks of the blades exposed and the first and second components about to be squeezed together.
Figure 11:
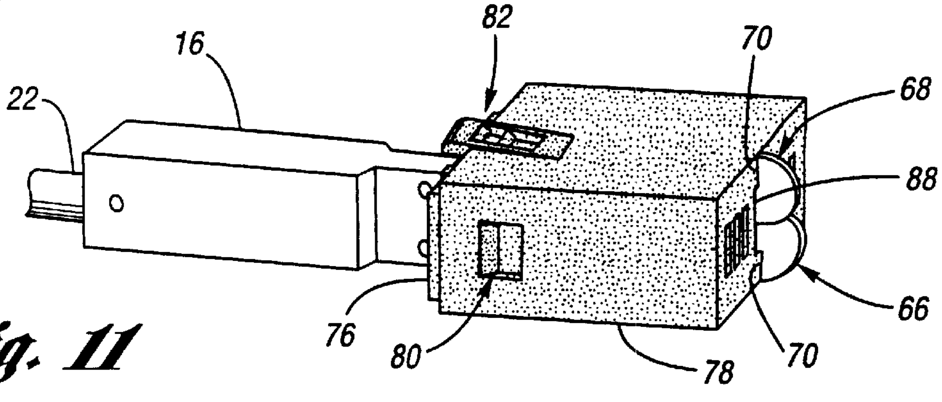
FIG. 11 is a perspective view showing the connector fully mated at a second stage of the interlock mechanism thereof due to mating force supplied by the mating tool.

Now the mating tool 10, 10' is actuated to effect sliding of the drive rod 22 rearwardly (see arrow R) relative to the head 16. In this regard, the mating tool achieves the intermediate state of operation, wherein the hooks 66, 68 are fully exposed, prior to the distal end portion re-entering the passageway. That is, the intermediate state of operation of the mating tool occurs prior to the distance between the abutments 70 and the forward end of the head 16 equals the width 92 of the pre-staged connector. Now, as shown at FIG. 10, since the abutments 70 abut the exit side 90 and the forward end 18 of the head 16 (which is now serving as an abutment) abuts the entry side 90*a*, as blades 12, 14 further slide relative to the head to the final state of operation of the mating tool the first and second components 76, 78 are squeezed together by the decreasing distance between the abutments and the forward end of the head, until the interlock mechanism 80 achieves its second stage and the connector is fully mated, as shown at FIG. 11.

To withdraw the blades from the passageway, the mating tool is returned to the initial state of operation, during which the blades are slid forwardly relative to the head whereupon the hooks are again retracted (unexposed) and the blades may then be slidably removed from the passageway.

To those skilled in the art to which this invention appertains, the above described preferred embodiments may be subject to change or modification. Such change or modification can be carried out without departing from the scope of the invention, which is intended to be limited only by the scope of the appended claims.

What is claimed is:

1. A connector mechanical assist system comprising:

a connector comprising: a first component; and a second component connectable with said first component; said first and second components each having a passage which mutually cooperate to form a passageway through said first and second components when said first and second components are mated; and a mating tool comprising: a head; a pair of blades slidably mounted to said head, each blade of said pair of blades having a distal end portion which includes a hook, wherein the hook of each blade is retracted relative to the other when said blades are mutually parallel and opposingly exposed when said blades mutually cross each other; and cam means for mutually crossing said pair of blades selectively responsive to sliding movement of said pair of blades relative to said head;

wherein when said pair of blades are located in said passageway, a sliding movement of said pair of blades causes said first and second components to be squeezed together between said head and said hook of each blade.

2. The connector mechanical assist system of claim 1, wherein said cam means comprises:

a pair of bosses connected with said head; and upper and lower cam surfaces of said pair of blades, wherein one boss of said pair of bosses abuts the upper cam surface of each blade, and wherein the other boss of said pair of bosses abuts the lower cam surface of each blade.

3. The connector mechanical assist system of claim 2, wherein each blade of said pair of blades comprises:

a first blade segment having a terminus;

a second blade segment having said distal end portion; and an off-set interconnecting said first and second blade segments, wherein said second blade segment is parallel to said first blade segment, and wherein the upper and lower cam surfaces of said second blade segment are displaced relative to the upper and lower cam surfaces of said first blade segment an amount determined by said off-set.

4. The connector mechanical assist system of claim 3, wherein said pair of blades are positioned in a side-by-side relationship, wherein one blade is reversed relative to the other blade; further wherein said pair of blades are pivotally connected to each other at the terminus thereof.

5. The connector mechanical assist system of claim 4, wherein said off-set displaces said second blade segment relative to said first blade segment an amount substantially equal to a width of each blade as measured between the upper and lower cam surfaces thereof.

6. The connector mechanical assist system of claim 5, further comprising sliding movement enabling means for effecting sliding movement of said pair of blades relative to said head.

7. The connector mechanical assist system of claim 6, further comprising a two-stage interlock mechanism means for connecting said first and second components together in a pre-stage condition and for locking said first and second components together in a fully mated condition.

8. The connector mechanical assist system of claim 6, wherein said sliding movement enablement means comprises plier means for effecting sliding movement of said pair of blades relative to said head in response to a squeezing movement of a hand.

9. The connector mechanical assist system of claim 8, further comprising a two-stage interlock mechanism means for connecting said first and second components together in a pre-stage condition and for locking said first and second components together in a fully mated condition.

10. The connector mechanical assist system of claim 6, wherein said sliding movement enablement means comprises actuator means for effecting sliding movement of said pair of blades relative to said head.

11. The connector mechanical assist system of claim 10, further comprising a two-stage interlock mechanism means for connecting said first and second components together in a pre-stage condition and for locking said first and second components together in a fully mated condition.

12. A connector mechanical assist system comprising:

a connector comprising: a first component; and a second component connectable with said first component; said first and second components each having a passage which mutually cooperate to form a passageway through said first and second components when said first and second components are mated; and a mating tool comprising: a head; a pair of blades slidably mounted to said head, each blade of said pair of blades having a distal end portion which includes a hook, each blade further having a terminous opposite said distal end portion wherein each blade is mutually pivotally connected at said terminus thereof, wherein the hook of each blade is retracted relative to the other when said blades are mutually parallel and opposingly exposed when said blades mutually cross each other; and cam means for mutually crossing said pair of blades selectively responsive to sliding movement of said pair of blades relative to said head;

wherein when said pair of blades are located in said passageway, a sliding movement of said pair of blades causes said first and second components to be squeezed together between said head and said hook of each blade; and wherein said cam means comprises:

a pair of bosses connected with said head; and upper and lower cam surfaces of said pair of blades, wherein one boss of said pair of bosses abuts the upper cam surface of each blade, and wherein the other boss of said pair of bosses abuts the lower cam surface of each blade.

13. The connector mechanical assist system of claim 12, wherein each blade of said pair of blades comprises:

a first blade segment having said terminus;

a second blade segment having said distal end portion; and an off-set interconnecting said first and second blade segments, wherein said second blade segment is parallel to said first blade segment, and wherein the upper and lower cam surfaces of said second blade segment are displaced relative to the upper and lower cam surfaces of said first blade segment an amount determined by said off-set;

wherein said pair of blades are positioned in a side-by-side relationship, and wherein one blade is reversed relative to the other blade.

* * * * *